US011977268B2

(12) United States Patent
Baker et al.

(10) Patent No.: US 11,977,268 B2
(45) Date of Patent: May 7, 2024

(54) FIBER OPTIC CABLE ASSEMBLIES HAVING EXPOSABLE CABLE LEGS FOR SUPPORTING MULTIPLE DEPLOYMENT SCENARIOS

(71) Applicant: Corning Research & Development Corporation, Corning, NY (US)

(72) Inventors: Kevin James Baker, Haslet, TX (US); Joseph Clinton Jensen, Lawndale, NC (US); Radawan Ripumaree, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 173 days.

(21) Appl. No.: 17/749,302

(22) Filed: May 20, 2022

(65) Prior Publication Data
US 2022/0373750 A1     Nov. 24, 2022

Related U.S. Application Data

(60) Provisional application No. 63/192,244, filed on May 24, 2021.

(51) Int. Cl.
     *G02B 6/44*          (2006.01)
     *G02B 6/42*          (2006.01)

(52) U.S. Cl.
     CPC ....... *G02B 6/4471* (2013.01); *G02B 6/44715* (2023.05); *G02B 6/4476* (2013.01); *G02B 6/4269* (2013.01)

(58) Field of Classification Search
None
See application file for complete search history.

(56) References Cited

U.S. PATENT DOCUMENTS

| 7,409,127 | B1* | 8/2008 | Hurley | G02B 6/4416 |
| | | | | 385/101 |
| 10,678,012 | B1* | 6/2020 | Wu | G02B 6/562 |
| 11,740,413 | B1* | 8/2023 | Huang | G02B 6/3871 |
| | | | | 385/78 |
| 2005/0029004 | A1* | 2/2005 | Robinson | G02B 6/4471 |
| | | | | 174/72 A |

(Continued)

FOREIGN PATENT DOCUMENTS

EP         2165043 B1     6/2013

*Primary Examiner* — Jerry Rahll
(74) *Attorney, Agent, or Firm* — Michael E. Carroll, Jr.

(57) ABSTRACT

Fiber optic cable assemblies having a construction suitable for a first deployment scenario where the optical connection is made to the device externally that may be transformed for a second deployment scenario where the optical connection is disposed within an internal cavity of the device are disclosed. The cable assembly has one or more cable legs disposed within a profile support element and are disposed under the heat shrink. The fiber optic connectors are exposed and suitable for optical connection with the heat shrink intact on the cable assembly and the profile support element further provides further flexibility using different outer housings with the cable assembly when making external optical connections to the device Thus, the concepts disclosed advantageously allow a single cable assembly to support multiple deployment scenarios in the field, thereby reducing complexity.

20 Claims, 8 Drawing Sheets

(56) References Cited

U.S. PATENT DOCUMENTS

| | | | |
|---|---|---|---|
| 2005/0265672 A1* | 12/2005 | Theuerkorn | G02B 6/4461 |
| | | | 385/100 |
| 2008/0170828 A1* | 7/2008 | Elkins | G02B 6/4475 |
| | | | 385/95 |
| 2011/0034068 A1* | 2/2011 | Russell | G02B 6/4416 |
| | | | 439/502 |
| 2012/0045178 A1* | 2/2012 | Theuerkorn | G02B 6/3898 |
| | | | 29/505 |
| 2013/0251319 A1* | 9/2013 | Compton | G02B 6/2558 |
| | | | 385/99 |
| 2014/0241676 A1* | 8/2014 | Smith | G02B 6/4479 |
| | | | 385/100 |
| 2015/0226927 A1* | 8/2015 | Islam | G02B 6/4416 |
| | | | 385/101 |
| 2016/0372236 A1* | 12/2016 | Yoshikawa | G02B 6/4472 |
| 2018/0120530 A1* | 5/2018 | Compton | G02B 6/46 |
| 2018/0372981 A1* | 12/2018 | Lane | G02B 6/3885 |
| 2019/0004273 A1* | 1/2019 | Faulkner | G02B 6/4476 |
| 2021/0364715 A1* | 11/2021 | Islam | G02B 6/4219 |
| 2022/0026658 A1* | 1/2022 | Gajek | G02B 6/4471 |

* cited by examiner

FIBER OPTIC CABLE ASSEMBLIES HAVING EXPOSABLE CABLE LEGS FOR SUPPORTING MULTIPLE DEPLOYMENT SCENARIOS

CROSS REFERENCE TO RELATED APPLICATIONS

This application claims the benefit of priority of U.S. Provisional Application Ser. No. 63/192,244 filed on May 24, 2021, the content of which is relied upon and incorporated herein by reference in its entirety.

FIELD

The disclosure is directed to fiber optic cable assemblies having a construction suitable for a first deployment scenario where the optical connection is made to the device externally and may be transformed for a second deployment scenario where the optical connection is disposed within an internal cavity of the device. The fiber optic cable assemblies use a profile support element with one or more cable legs extending from a furcation body. Portions of the cable leg(s) are disposed in a portion of the profile support element and disposed under a heat shrink for the first deployment scenario with the optical connection at the wall of the device while the heat shrink is still intact. In the second deployment scenario, a portion of the heat shrink and the profile support element are removed for exposing the one or more cable legs for routing the cable legs within the internal cavity of second-type of device for optical connection.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like such as feeding signals to and from wireless radios at a cellular telephone tower. As optical fiber extends deeper into communication networks there exists a need for building more complex and flexible fiber optic networks in a quick and easy manner.

As different service providers build their own proprietary communication networks they typically use equipment from different suppliers and employ different specifications and requirements for their proprietary networks. By way of example, a first service provider may use a wireless radio at a cellular telephone tower that makes the optical connection to the wireless radio at the wall of the wireless radio using a fiber optic cable assembly.

On the other hand, a second service provider may use a wireless radio at a cellular telephone tower that routes the fiber optic connectors into the wireless radio for optical connection within an internal cavity of the wireless radio.

Further complexity also results from the many different types of fiber optic connectors that are used with different wireless radios. Still further complexity can be encountered with the different wireless radios or network service provides using different types of outer housing assemblies for protecting the optical connection between the fiber optic cable assemblies and the device.

To support these different deployment scenarios cable assembly manufactures have provided different cable assemblies for the different deployment scenarios encountered for optically connecting to the different equipment and/or architectures used by the various service providers for building communication networks. Manufacturing many different fiber optic cables assemblies for use with different equipment and/or architectures presents challenges and complexities for the manufacturer, technicians and the network service providers such as managing and stocking a multitude of different products for building the communication network.

Consequently, there exists an unresolved need for fiber optic cable assemblies that provide flexibility in supporting multiple different deployment scenarios used by service providers in their communications networks.

SUMMARY

The disclosure is directed to fiber optic cable assemblies suitable for supporting multiple deployment scenarios since it can transition from a first construction useful for optical connection with a first device having an external optical connection to a second construction useful for a second device with optical connection disposed within an internal cavity. Moreover, the first construction of the cable assemblies is useful for cooperating with different outer housings or outer housing assemblies used with a variety of different devices and/or fiber optic connectors.

A first aspect of the disclosure is directed to a fiber optic cable assembly suitable for supporting multiple deployment scenarios and comprises a fiber optic cable comprising one or more optical fibers and at least one strength member, one or more fiber optic connectors terminated on the one or more optical fibers with a furcation body attached to the fiber optic cable, a heat shrink, a profile support element, one or more cable legs. The heat shrink is disposed between the one or more fiber optic connectors and the furcation body, wherein the one or more fiber optic connectors are exposed at the end of the cable assembly outside of the heat shrink and suitable for optical connection with the heat shrink intact. The cable assembly also comprises a profile support element having at least one slot and one or more cable legs extending from the furcation body with a portion of the one or more cable legs disposed within the at least one slot of the profile support element, and wherein a portion of the profile support element and a portion of the one or more cable legs are disposed under the heat shrink.

A second aspect of the disclosure is directed to a fiber optic cable assembly suitable for supporting multiple deployment scenarios and comprises a fiber optic cable comprising one or more optical fibers and at least one strength member, a first fiber optic connectors and a second fiber optic connector terminated on the one or more optical fibers with a furcation body attached to the fiber optic cable, a heat shrink, a profile support element, a first cable leg disposed with the profile support element and a second cable leg disposed within the profile support element. The heat shrink is disposed between the first and second fiber optic connectors and the furcation body, and are exposed at the end of the cable assembly outside of the heat shrink and suitable for optical connection with the heat shrink intact. The cable assembly also comprises a portion of the profile support element with the first and second cable legs disposed under the heat shrink.

A third aspect of the disclosure is directed to a fiber optic cable assembly suitable for supporting multiple deployment scenarios and comprises a fiber optic cable comprising one or more optical fibers and at least one strength member, one or more fiber optic connectors terminated on the one or more optical fibers with a furcation body attached to the fiber optic cable, a heat shrink, a profile support element, one or more cable legs. The heat shrink is disposed between the one or more fiber optic connectors and the furcation body, wherein the one or more fiber optic connectors are exposed at the end of the cable assembly outside of the heat shrink and suitable for optical connection with the heat shrink intact. The cable assembly also comprises a profile support element having at least one slot, one or more cable legs extending from the furcation body with a portion of the one or more cable legs disposed within the at least one slot of the profile support element, and a RF deterrent, wherein a portion of the profile support element, a portion of the one or more cable legs and RF deterrent are disposed under the heat shrink.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The concepts disclosed are related to fiber optic cable assemblies (hereinafter "cable assemblies") suitable for supporting multiple deployment scenarios required by different devices such as different fiber optic terminals or wireless radios useful for mobile service or other communication networks. This deployment flexibility for the cable assemblies advantageously reduces complexity for the manufacturer making the cable assembly, the technician installing the cable assembly and the network service provider purchasing cable assemblies. The cable assemblies disclosed comprise a fiber optic cable having one or more fiber optic connector terminated on respective optical fibers along with one or more cable legs extending from a furcation body. The one or more cable legs are disposed within at least one slot of a profile support element, and a portion of the profile support element and a portion of the one or more cable legs are disposed under a heat shrink.

Using the profile support element in the cable assembly also provides a suitable support surface for an optional outer housing that may be used when making the optical connection from the outside or exterior to the device and can provide stability or strain-relief at the attachment. The outer housing may also be a portion of an outer housing assembly that further comprises a compression member for weatherproofing the interface between the cable assembly or not. The profile support element of the cable assemblies disclosed provides a suitably stable surface for squeezing the compression member for providing a weatherproof seal.

One or more strength members or ripcords of the fiber optic cable may also optionally be disposed under the heat shrink of the cable assemblies for convenience in aiding the removal of the heat shrink from the cable assembly for exposing the cable legs underneath or not. If not used, the technician can merely cut the strength member or ripcord from the cable assemblies disclosed so that is not burdensome.

When the terminal or wireless radio requires the optical connectors to make an optical connection near or at a wall of the terminal or wireless radio from the outside, then the cable assembly can be made with the heat shrink intact on the cable assembly.

Figure 1:
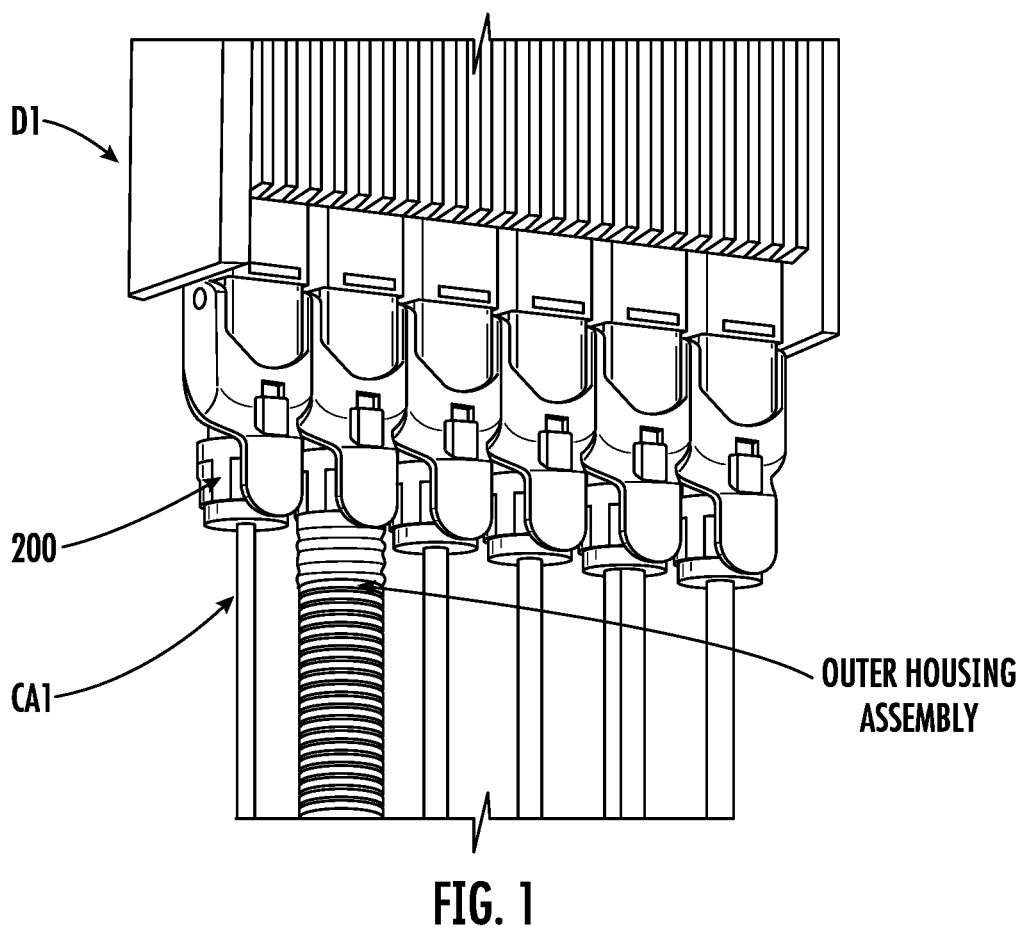
FIG. 1 depicts a first deployment scenario where a fiber optic cable assembly makes the optical connection to a first device (such as a fiber optic terminal or wireless radio) using optical connection ports disposed at or near an exterior wall of the device so that the optical connection is made from outside of the device.

FIG. 1 depicts a device (D1) such as terminal or wireless radio where the optical connection between the cable assembly (CA1) and device (D1) is made near or at a wall of the device. Additionally, the cable assembly may further comprise an outer housing that fits about the one or more fiber optic connectors for protecting the optical connection as depicted in FIG. 1. The cable assembly may further comprise an outer housing assembly that includes one or more other components such as a compression member, coupling nut or other structure as desired. For instance, the outer housing assembly may comprise a compression member that fits about a portion of the cable assembly and aiding in weatherproofing the optical connection of the cable assembly.

Alternatively, when the terminal or wireless radio requires the cable legs to enter an internal cavity of the device due to the optical connectors being disposed within the internal cavity of the device, then the heat shrink and profile support element may be removed for exposing the one or more cable legs for routing the cable legs and fiber optic connector(s) within the device for optical connection.

Figure 2:
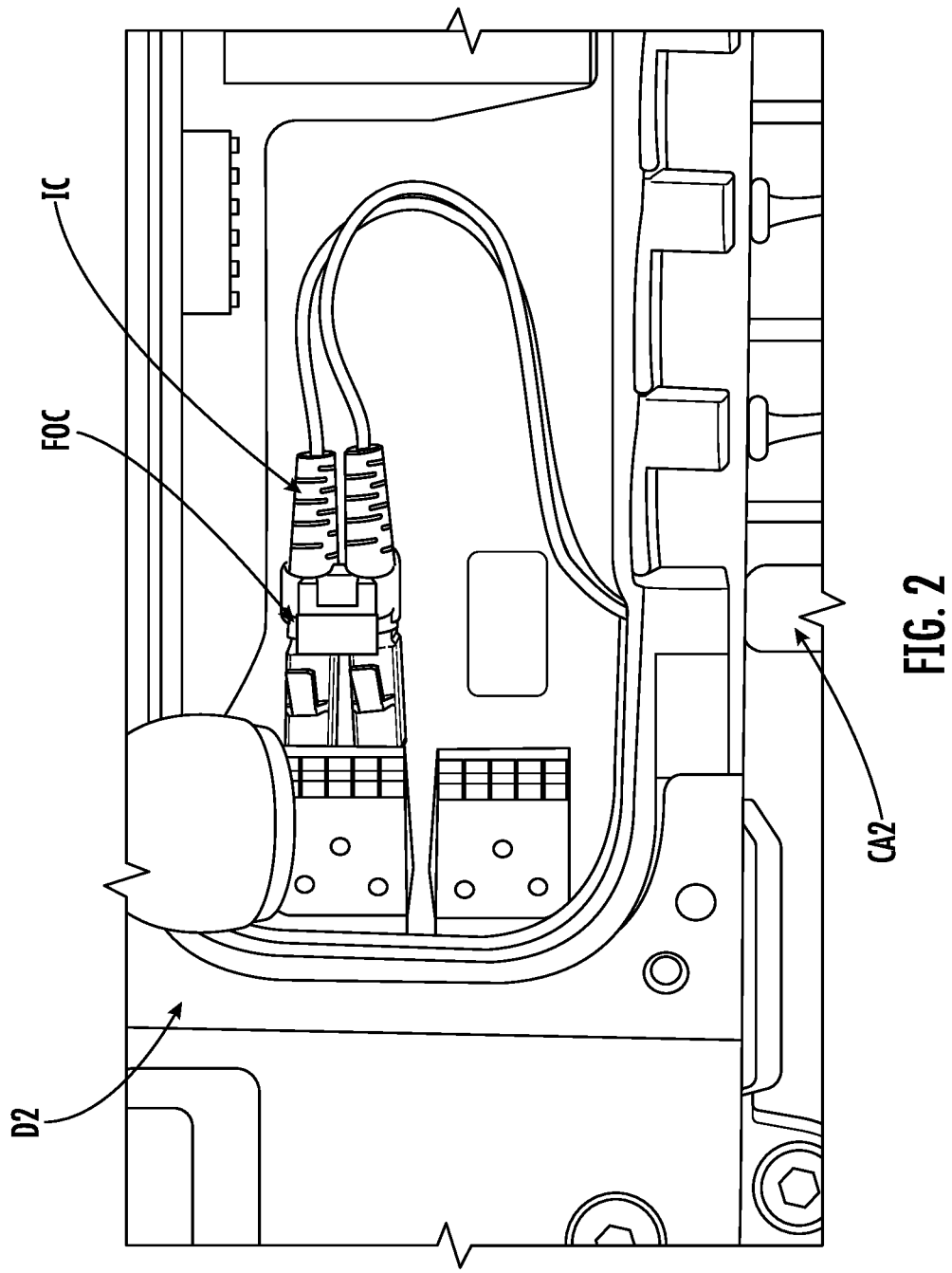
FIG. 2 depicts a second deployment scenario where a fiber optic cable assembly makes the optical connection to a second device within the internal cavity of the device such as by opening or removing a cover of the device so that the fiber optic connector of the fiber optic cable assembly extends past an exterior wall of the device and into an internal cavity of the device for optical connection.

FIG. 2 depicts an explanatory device (D2) such as terminal or wireless radio where the optical connection between the fiber optic connectors of the cable assembly (CA2) and device is disposed within an internal cavity (IC) of the device (D2). As shown, cable legs are exposed for routing within the internal cavity of the device. Cable assemblies disclosed typically have relatively short cable legs, but any suitable length is possible. By way of explanation, the cable legs use a short length within the internal cavity of the device. For instance, the cable legs could have a length of 20 centimeters (cm) or less, or 15 cm or less as desired for the deployment scenario.

The cable assembly concepts disclosed herein are equally applicable to other optical applications besides devices for outside plant applications such as indoor, industrial, or other suitable applications. Additionally, the concepts disclosed may be used with cable assemblies having any suitable fiber optic cable construction or any suitable fiber optic connector. Various designs, constructions, or features for cable assemblies are disclosed in more detail as discussed herein and may be modified or varied as desired.

Figure 3:
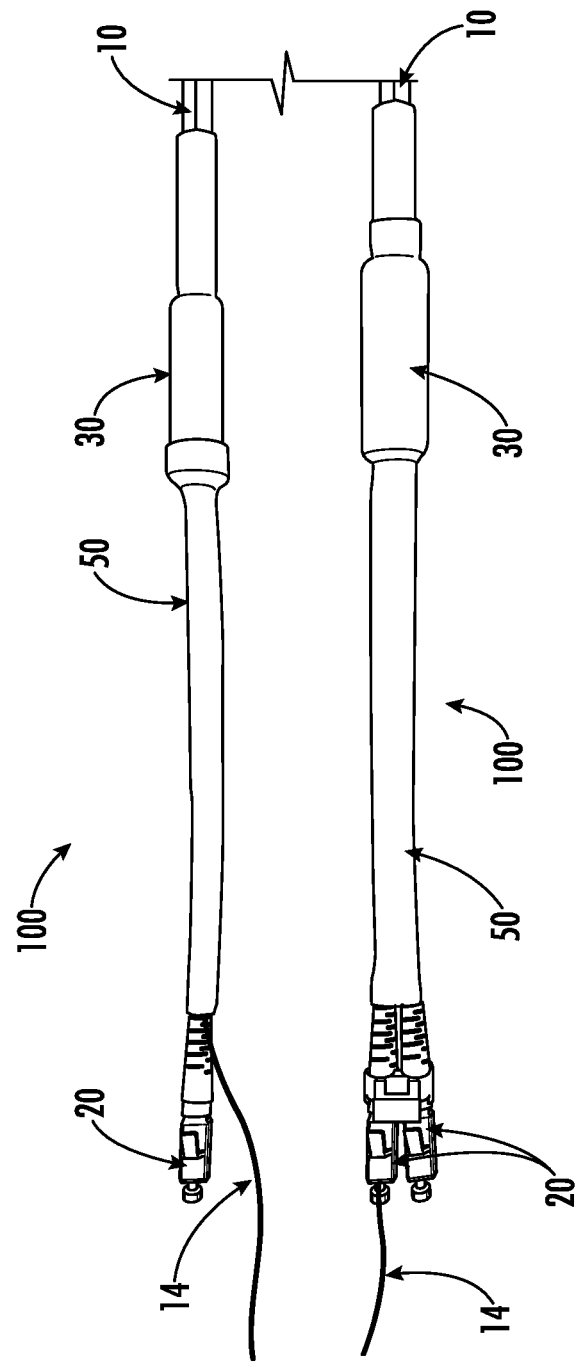
FIG. 3 depicts end portions of explanatory fiber optic cable assemblies having a construction suitable for either first or second scenarios where the one or more cable legs extend from a furcation body of the cable assembly and a portion of the one or more cable legs are disposed within a profile support element with a portion of the profile support element and cable leg(s) disposed under a heat shrink, thereby being useful for a first deployment scenario such depicted in FIG. 1 with the heat shrink intact for making the optical connection at or near an exterior wall of the device.

FIG. 3 depicts end portions of two different explanatory cable assemblies 100 according to the concepts disclosed. The top cable assembly 100 has a single fiber optic connector 20 and the bottom cable assembly 100 has a first and second fiber optic connector 20a, 20b terminated on respective optical fibers of respective cable legs 70a,70b. The concepts disclosed herein may be used with cable assemblies having any suitable number of fiber optic connectors 20 respectively terminated on one or more optical fibers of fiber optic cable 10. The fiber optic connectors may be single or multi-fiber optic connectors as desired. Also the cable assembly may have multiple fiber optic connectors associated with the same cable leg 70.

Cable assemblies 100 comprise a furcation body 30 attached to fiber optic cable 10 as shown in FIG. 3. Furcation body 30 is the transition location where the optical fibers 12 are broken out from the fiber optic cable 10 into one or more cable legs 70 that extend from the furcation body 30. Besides breaking out the optical fibers into one or more cable legs 70 for routing the optical fibers to the fiber optic connector(s) 20, the cable legs 70 may also provide a smaller diameter tube that is more flexible than the fiber optic cable, thereby allowing improved bending for routing and bending in compact locations while still protecting the optical fibers. The concepts disclosed herein may be used with fiber optic cables 10 having a single optical fiber 12 as shown as well, thereby allowing the flexibility of the cable assembly to be optical connected at the wall of the device or to expose the cable leg 70 for making an optical connection within an internal cavity of the device such as shown in FIG. 2.

As shown in FIG. 3, the one or more fiber optic connectors 20 are exposed at the end of the cable assemblies 100 outside of the respective heat shrink 50. Thus, the fiber optic connectors 20 are suitable for optical connection with the heat shrink 50 intact on the cable assembly 100. Illustratively, the cable assemblies 100 of FIG. 3 may be used in a first deployment scenario where the optical connection is made to a device such as a terminal or wireless radio near or at a wall of the device with the heat shrink 50 intact on the cable assembly.

On the other hand, when the optical connections of a device are disposed within an internal cavity (IC) such as depicted in FIG. 2, then the cable assemblies 100 of FIG. 3 may have the heat shrink 50 removed for exposing the cable legs 70 so they may be removed from the profile support element 60 for routing the cable legs 70 within the internal cavity of the device such as a terminal or wireless radio, thereby allowing the same cable assembly to be used for the second deployment scenario as well as the first deployment scenario. The heat shrink 50 may be removed using an optional strength member or a ripcord 14 of the fiber optic cable 10 that is disposed under the heat shrink 50.

The cable assembly concepts disclosed herein may be used without a strength member 14 or ripcord that is available near the end of the heat shrink 50 for tearing and removing the heat shrink 50 such as by removing the heat shrink 50 with a blade or scissors. However, the available strength member or ripcord 14 provide a convenience for the technician along with inhibiting damage to the cable assembly that may be caused by careless use of a blade or scissors along with being safer for the technician. If the strength member or ripcord 14 is not needed for the deployment scenario, then the technician may merely cut the protruding end of the same.

Figure 4:
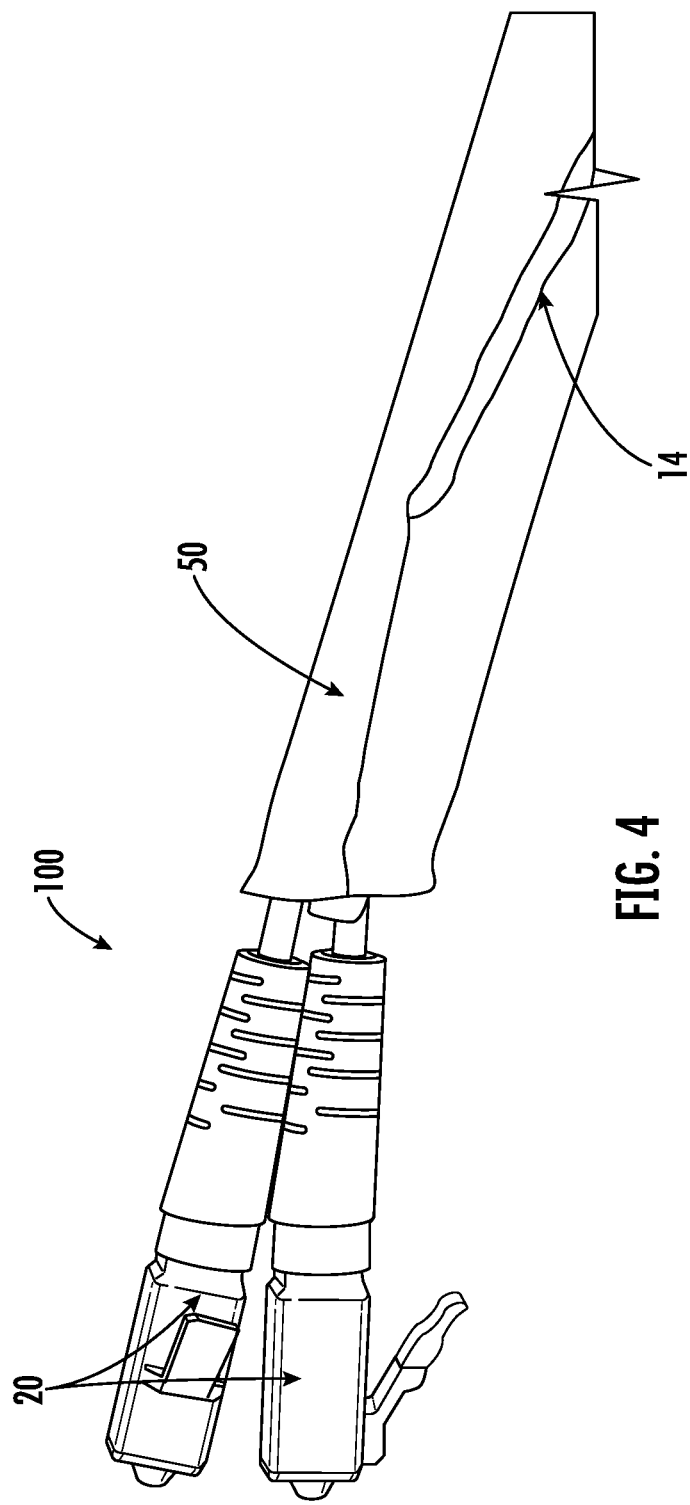
FIG. 4 shows an end portion of a fiber optic cable assembly with the strength member being pulled through a portion of the heat shrink for accessing the cable leg(s) disposed under the heat shrink for transitioning the cable assembly for use in the second deployment scenario like depicted in FIG. 2 where the cable legs are exposed and the optical connection is made within an internal cavity of device.
Figure 5:
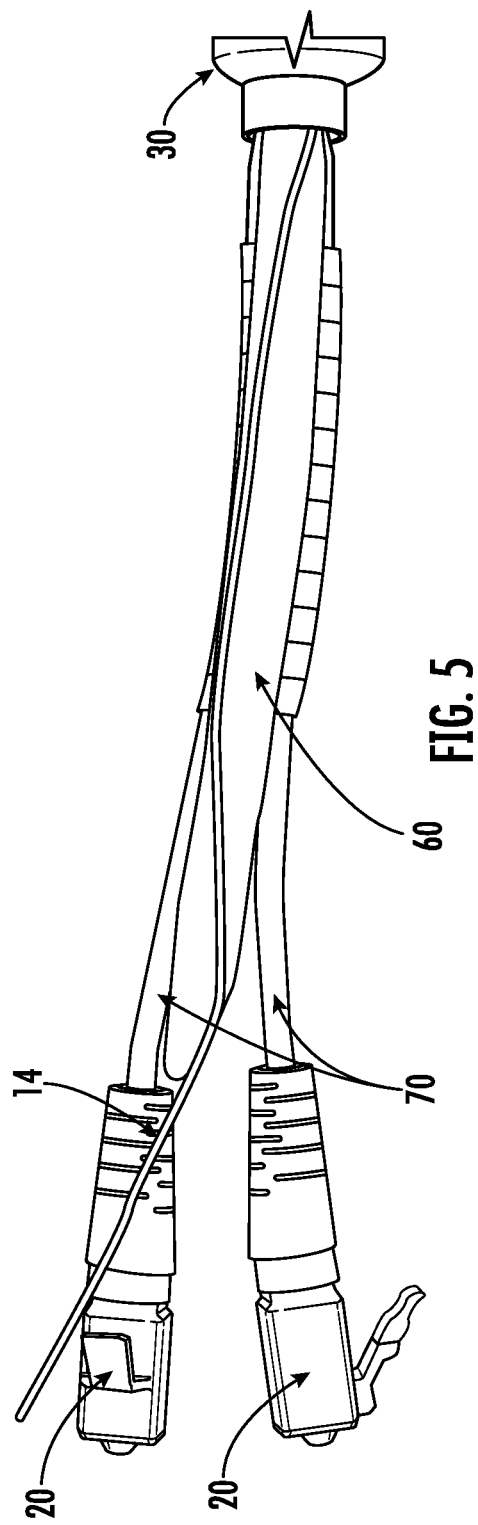
FIG. 5 depicts the fiber optic cable assembly of FIG. 4 with the heat shrink removed so that the cable legs may be removed from the profile support element and exposed for routing within an internal cavity of a device in a second deployment scenario.
Figure 6:
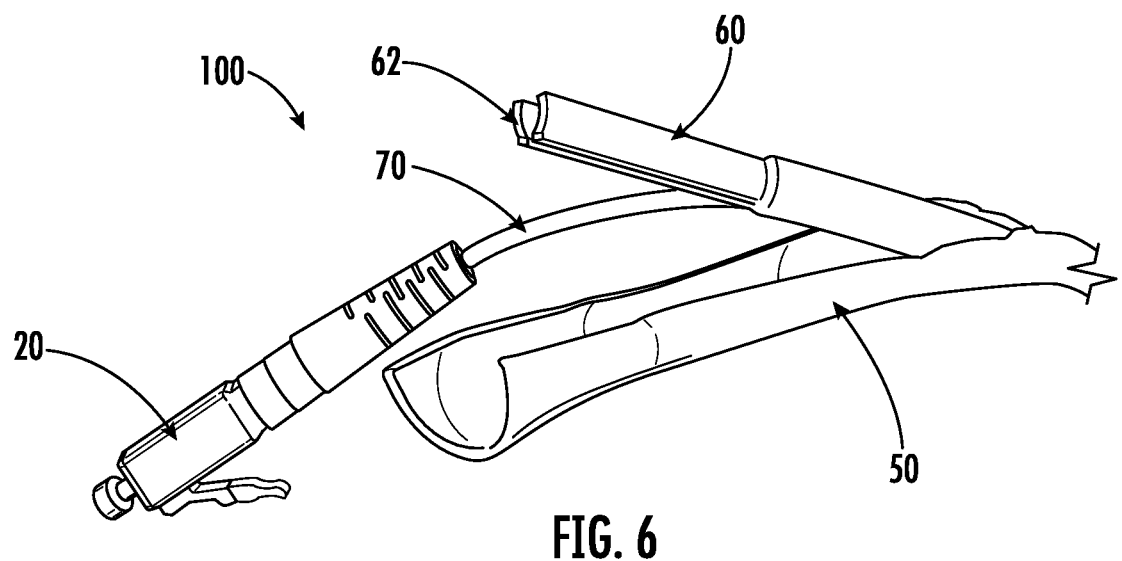
FIG. 6 depicts a fiber optic cable assembly having a single fiber optic connector being modified for use in a second deployment scenario by removing the heat shrink so the cable leg may be removed from the profile support element, thereby exposing the cable leg for routing within an internal cavity of the device.

FIGS. 4-6 depict examples of the heat shrink 50 being removed from respective cable assemblies for exposing a portion of the one or more cable legs 70 that are disposed under the heat shrink 50. FIG. 4 shows the strength member 14 of the cable assembly 100 being pulled through a portion of the heat shrink 50 for aiding the removal of the same. FIG. 5 depicts the cable assembly with the heat shrink removed with a portion of the one or more cable legs 70 disposed within at least one slot 62 of the profile support element 60.

The view of FIG. 5 could also represent a portion of the construction of cable assembly 100 with the cable legs 70 disposed within the profile support element 60 and the strength member or ripcord 14 in place before the heat shrink 50 is applied to the cable assembly.

FIG. 6 is perspective view another cable assembly 100 with a single cable leg 70 being removed from the slot 62 of the profile support element 60 as the heat shrink 50 is removed from the cable assembly for exposing the cable leg 70 and transforming the cable assembly for the second deployment scenario.

Profile support element 60 may be formed from any suitable material such as polymer, glass-reinforced plastic or the like. The profile support element 60 provides a rigid portion for cable assembly located after the furcation body that may be used for supporting the attachment and optical connection with the device. Profile support element 60 may also provide a support structure for adding an optional outer housing when mounting the cable assemblies to the device from the exterior.

Profile support element 60 may have one or more slots 62 for receiving a portion of the cable legs 70 therein. For instance, the profile support element could have a round cross-sectional profile with a slot formed in the profile and sized for receiving a portion of one or more cable legs 70. The cable legs 70 are disposed within the profile support element for providing a more uniform cross-sectional profile for protecting the cable legs and/or weatherproofing using an outer housing assembly.

Other shapes for the profile support element 60 are possible such as a profile support element with a first slot and a second slot disposed on different portions of the profile support element for receiving multiple cable legs 70 such as shown in FIG. 5. The profile support element has a length so that it extends from the furcation body 30, but does not interfere with the boot or other component of the fiber optic connector 20.

Figure 7:
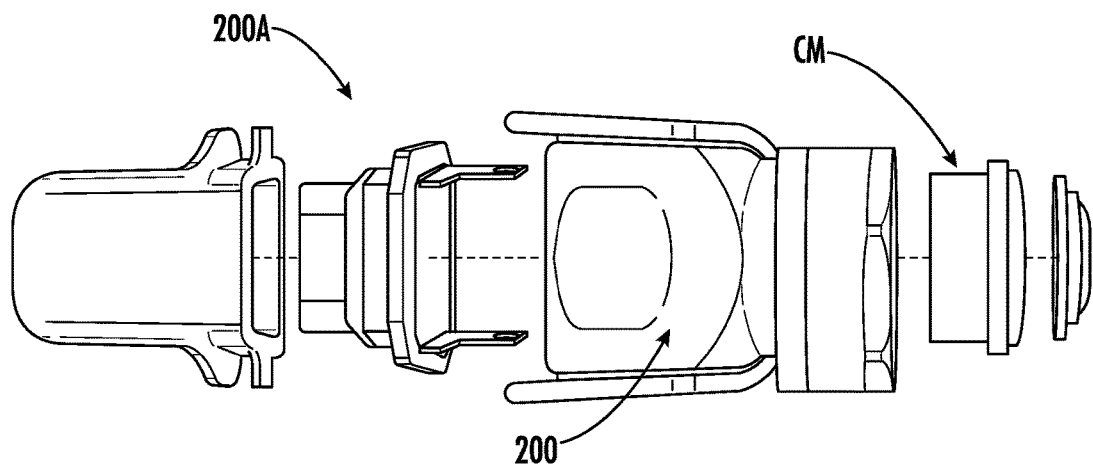
FIG. 7 depicts a first outer housing that may be part of an outer housing assembly useful with the fiber optic cable assemblies where the outer housing portion fits about a portion of fiber optic connector(s) for protecting the optical connection at the device.
Figure 8:
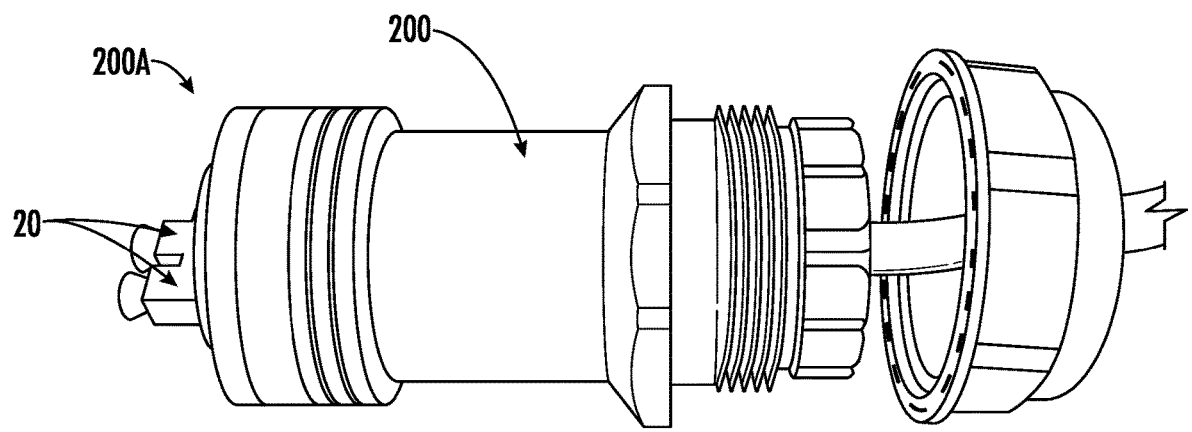
FIG. 8 depicts a fiber optic cable assembly using a second outer housing that is a portion of an outer housing assembly for protecting the fiber optic connector(s) and optical connection at the device.
Figure 9:
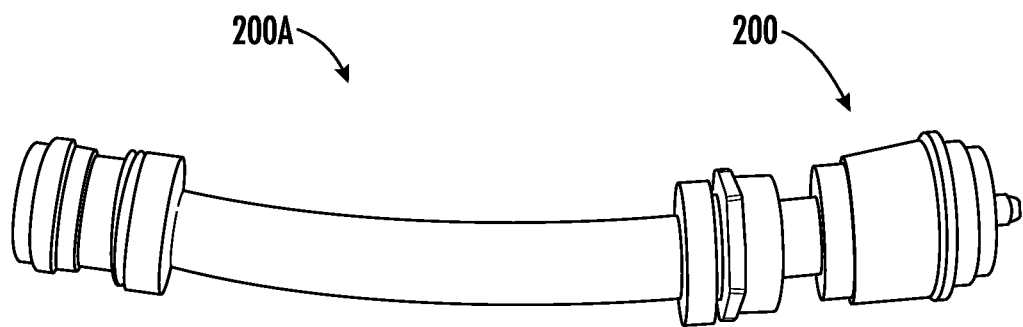
FIG. 9 depicts a third outer housing that is a portion of an outer housing assembly for use with cable assembles about the optical connection at the device.

Profile support element 60 has a generally rigid, but flexible construction. The profile support element 60 provides a support structure so that a compression element (or other element of an outer housing assembly) such as depicted in FIGS. 7-9 may be compressed about this portion of the cable assembly. In other words, the profile support element 60 provides a suitable surface on the cable assembly for making a weatherproof interface with the outer housing assembly 300. Consequently, the profile support element inhibits compression forces from an optional outer housing assembly 300 from causing undue optical attenuation of the optical fibers. Moreover, the profile support element can have any suitable size or shape as needed for the desired cable assembly. The cable assembly concepts disclosed may be used for a suitable number of cable legs, fiber optic connectors, fiber optic cables with any suitable combination.

The deployment flexibility for the cable assemblies disclosed advantageously reduces complexity for the manufacturer making the cable assembly, the technician installing the cable assembly and the network service provider purchasing cable assemblies.

Specifically, the manufacturer only needs to manufacture a single-type of cable assembly for optical connection with device D1 such as shown in FIG. 1, and device D2 such as shown in FIG. 2. The technician in the field only needs carry a single-type of cable assembly on the service vehicle for making an optical connection with the different devices that may be encountered. Likewise, the network service provider or distributor only needs to purchase and/or stock a single-type of cable assembly for building the communication network regards which type of device is installed in the field.

If desired, the cable assemblies 100 may also comprise an outer housing 200 that fits about one or more suitable fiber optic connectors 20 for mounting or protecting the optical connection as known in the art. Outer housings 200 may be a portion of an outer housing assembly 300 that also provide strain-relief to the device, sealing of the connection interface, mounting and/or interfacing with the device. Outer housings are typically used where the optical connection is made near or at the wall of the device such as shown in FIG. 1. Further, the outer housing 200 may be a portion of outer housing assembly and may vary depending upon the specific brand of device used in the network and/or brand of fiber optic connector used on the cable assembly. The outer housing assembly may include further components for weatherproofing the attachment of the cable assembly to the device.

For instance, the outer housing 200 may be a portion of an outer housing assembly 300 that comprises a compression member 202 that helps make a weatherproof attachment to the cable assembly so that the outer housing can weatherproof the optical connection to the device. Compression members are typically squeezed about a portion of the cable assembly by tightening a coupling nut to a portion of the outer housing, thereby squeezing the compression member and weatherproofing the rear interface between the outer housing and portion of the cable assembly. In order to properly weatherproof the interface, the compression member needs to compress onto a portion of the cable assembly that can withstand the compression force such as the furcation body or the like, without causing undue optical attenuation. Cable assemblies 100 use a construction with the profile support element as disclosed for providing such a location for weatherproofing between the furcation body 30 and fiber optic connectors 20.

FIGS. 7-9 depicts different outer housings 200 that may fit about the one or more fiber optic connectors 20. FIG. 7 depicts a first outer housing 200 for protecting the optical connection using fiber optic connectors 20. This outer housing 200 is a portion of an outer housing assembly 300 that further comprises a compression member 202 for weatherproofing as known in the art. The outer housing 200 and compression member 202 is depicted without a portion of the cable assembly.

FIG. 8 depicts another outer housing 200 that is a portion of an outer housing assembly 300 for protecting the optical connection of the cable assembly. This outer housing assembly 300 is shown disposed about a portion of the cable assembly 100 before the coupling nut 204 is threaded onto a rear portion of outer housing 200. A front portion of the outer housing 200 may attach to a portion of a terminal or wireless radio for attachment and/or strain-reliving the cable assembly to the device.

To use the outer housing, the optical connection is made to the device using the fiber optic connectors (which may also include a SPF or the like near the optical interface), then outer housing 200 is typically slid up and about the fiber optic connectors 20 and attached to the securing portion of the device at the front end of the outer housing 200. The compression member 202 then may be positioned if not already in place and then compressed about a portion of cable assembly for weatherproofing the interface between the cable assembly 100 and the outer housing 200 near the rear portion of the outer housing assembly 300.

FIG. 9 depicts yet another outer housing 200 for protecting the optical connection of cable assembly 100. This outer housing 200 is a portion of an outer housing assembly 300 that further comprises a flexible conduit with compression members and compression nuts on either side of the assembly. Still other outer housings and/or outer housing assemblies are possible for use with the cable assemblies disclosed herein.

Another cable assembly according to the concepts could further comprise a RF deterrent 80 disposed under the heat shrink 50 of cable assembly 100 as depicted in FIG. 9. For instance, RF deterrent 80 may be a foil such as a metal foil disposed about the profile support element 60 and cable legs 70 therein under the heat shrink 50 for suppressing any RF interference from the wireless radio, but other arrangements are possible. The RF deterrent 80 may be any suitable material such as aluminum or copper foil tape may be wrapped along the length of the profile support element 60, but other suitable materials may be used.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic cable assembly suitable for supporting multiple deployment scenarios, the cable assembly comprising:
   a fiber optic cable comprising one or more optical fibers and at least one strength member;
   one or more fiber optic connectors terminated on the respective one or more optical fibers;
   a furcation body attached to the fiber optic cable;
   a heat shrink disposed between the one or more fiber optic connectors and the furcation body, wherein the one or more fiber optic connectors are exposed at the end of the cable assembly outside of the heat shrink and suitable for optical connection with the heat shrink intact;
   a profile support element comprising at least one slot; and
   one or more cable legs extending from the furcation body, wherein a portion of the one or more cable legs is disposed within the at least one slot of the profile support element, and a portion of the profile support element and a portion of the one or more cable legs are disposed under the heat shrink.

2. The fiber optic cable assembly of claim 1, wherein the one or more cable legs comprise a first cable leg and a second cable leg, and the one or more fiber optic connectors comprise a first fiber optic connector disposed on the first cable leg and a second fiber optic connector disposed on the second cable leg.

3. The fiber optic cable assembly of claim 1, further comprising an outer housing that fits about the one or more fiber optic connectors for protecting the optical connection.

4. The fiber optic cable assembly of claim 1, further comprising a compression member that fits about a portion of the cable assembly.

5. The fiber optic cable assembly of claim 1, wherein at least one slot of the profile support element comprises a first slot and a second slot.

6. The fiber optic cable assembly of claim 1, wherein the at least one strength member extends beyond the heat shrink.

7. The fiber optic cable assembly of claim 1, further comprising a RF deterrent disposed under the heat shrink.

8. A fiber optic cable assembly suitable for supporting multiple deployment scenarios, the cable assembly comprising:
   a fiber optic cable comprising one or more optical fibers and at least one strength member;
   a first fiber optic connector terminated on one or more optical fibers;
   a second fiber optic connector terminated on one or more optical fibers;
   a furcation body attached to the fiber optic cable;
   a heat shrink disposed between the first and second fiber optic connectors and the furcation body, wherein the one or more fiber optic connectors are exposed at the end of the cable assembly outside of the heat shrink and suitable for optical connection with the heat shrink intact;
   a profile support element comprising at least one slot;
   a first cable leg comprising a portion disposed within the profile support element; and
   a second cable leg comprising a portion disposed within the profile support element, wherein a portion of the profile support element with the first cable leg and the second cable leg are disposed under the heat shrink.

9. The fiber optic cable assembly of claim 8, wherein the first fiber optic connector is disposed on the first cable leg and the second fiber optic connector is disposed on a second cable leg.

10. The fiber optic cable assembly of claim 8, further comprising an outer housing that fits about the one or more fiber optic connectors for protecting the optical connection.

11. The fiber optic cable assembly of claim 8, further comprising a compression member that fits about a portion of the cable assembly.

12. The fiber optic cable assembly of claim 8, wherein the profile support element comprises a first slot and a second slot.

13. The fiber optic cable assembly of claim 8, wherein the at least one strength member extends beyond the heat shrink.

14. The fiber optic cable assembly of claim 8, further comprising a RF deterrent disposed under the heat shrink.

15. A fiber optic cable assembly suitable for supporting multiple deployment scenarios, the cable assembly comprising:
   a fiber optic cable comprising one or more optical fibers and at least one strength member;
   one or more fiber optic connectors terminated on the respective one or more optical fibers;
   a furcation body attached to the fiber optic cable;
   a heat shrink disposed between the one or more fiber optic connectors and the furcation body, wherein the one or more fiber optic connectors are exposed at the end of the cable assembly outside of the heat shrink and suitable for optical connection with the heat shrink intact;
   a profile support element comprising at least one slot;
   one or more cable legs extending from the furcation body, wherein a portion of the one or more cable legs is disposed within the at least one slot of the profile support element; and
   a RF deterrent, wherein a portion of the profile support element with the one or more cable legs and the RF deterrent are disposed under the heat shrink.

16. The fiber optic cable assembly of claim 15, wherein the one or more fiber optic connectors comprise a first connector disposed on a first cable leg and a second connector disposed on a second cable leg.

17. The fiber optic cable assembly of claim 15, further comprising an outer housing that fits about the one or more fiber optic connectors for protecting the optical connection.

18. The fiber optic cable assembly of claim 15 further comprising a compression member that fits about a portion of the cable assembly.

19. The fiber optic cable assembly of claim 15, wherein the at least one slot of the profile support element comprises a first slot and a second slot.

20. The fiber optic cable assembly of claim 15, wherein the at least one strength member extends beyond the heat shrink.

* * * * *